United States Patent
Palenius et al.

(10) Patent No.: US 11,910,354 B2
(45) Date of Patent: Feb. 20, 2024

(54) PAGING AREA UPDATE

(71) Applicant: Sony Group Corporation, Tokyo (JP)

(72) Inventors: Torgny Palenius, Barsebäck (SE); Johan Hill, Lund (SE)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 17/799,723

(22) PCT Filed: Mar. 2, 2021

(86) PCT No.: PCT/EP2021/055119
§ 371 (c)(1),
(2) Date: Aug. 15, 2022

(87) PCT Pub. No.: WO2021/175815
PCT Pub. Date: Sep. 10, 2021

(65) Prior Publication Data
US 2023/0081204 A1    Mar. 16, 2023

(30) Foreign Application Priority Data
Mar. 2, 2020    (SE) .................................... 2030062-0

(51) Int. Cl.
*H04W 68/00*    (2009.01)
*H04B 17/318*    (2015.01)

(52) U.S. Cl.
CPC .......... *H04W 68/00* (2013.01); *H04B 17/318* (2015.01)

(58) Field of Classification Search
CPC ............................. H04W 68/00; H04B 17/318
(Continued)

(56) References Cited

U.S. PATENT DOCUMENTS

2010/0105389 A1* 4/2010 Chin ..................... H04W 36/08
                                                            455/436
2017/0164286 A1* 6/2017 Jeong ................ H04W 52/0258
(Continued)

FOREIGN PATENT DOCUMENTS

EP          3282732 A1    2/2018
WO      2019064260 A1    4/2019

OTHER PUBLICATIONS

International Search Report and Written Opinion from corresponding International Application No. PCT/EP2021/055119, dated Jun. 11, 2021, 11 pages.
(Continued)

*Primary Examiner* — Ted M Wang
(74) *Attorney, Agent, or Firm* — Tucker Ellis LLP

(57) ABSTRACT

According to various examples, a method for operating a wireless communication device (200) connectable to a cellular network (50) comprising a plurality of cells (300-340) is provided. The method comprises receiving (701), from the cellular network (50), configuration information for delaying a transmission of a paging area update request that triggers a paging area update of a paging area of a paging operation of the wireless communication device (200). Furthermore the method comprises, when operating in a disconnected mode associated with the paging operation, determining (703) that the paging area update is required, and upon determining (703) that the paging area update is required, delaying (708) the transmission of the paging area update request in accordance with the configuration information.

20 Claims, 6 Drawing Sheets

(58) Field of Classification Search
USPC .......................................................... 455/458
See application file for complete search history.

(56) References Cited

U.S. PATENT DOCUMENTS

2017/0289958 A1   10/2017   Dev
2019/0082393 A1    3/2019   Burugupalli

OTHER PUBLICATIONS

Ericsson, "RRC_Inactive battery consumption improvements in spotty NR coverage", 3GPP TSG-RAN WG2#105, R2-1901278, Feb. 25-Mar. 1, 2019, 4 pages.
Office Action and Search Report from corresponding Swedish Application No. 2030062-0, dated Jan. 18, 2021, 10 pages.

* cited by examiner

PAGING AREA UPDATE

TECHNICAL FIELD

Various examples of the invention generally relate to mobility management of a wireless communication device attachable to a cellular network. Various examples specifically relate to updating a paging area configuration in the wireless communication device.

BACKGROUND

Mobile communication using a wireless communication device (sometimes also referred to as a terminal or user equipment, UE) sometimes relies on operation of the wireless communication device in an idle mode. If compared to operation in a connected mode, power consumption can be reduced by operating the wireless communication device in the idle mode. When operating in the idle mode, a receive capability of a wireless interface of the wireless communication device can be reduced if compared to operation in the connected mode. For instance, the wireless interface of the wireless communication device can be temporarily transitioned into an inactive state that is associated with a reduced power consumption if compared to an active state. Further, the wireless interface, when operating in the idle mode, may not be able to receive all signals transmitted by, e.g., a cellular network. For instance, the wireless interface may monitor for paging signals transmitted by the cellular network, but not for others signals. Upon receiving one or more paging signals, the wireless communication device may transition from the operation in the idle mode to operation in the connected mode. This may involve a random-access (RA) procedure. When operating in the connected mode, a data connection is set up between the wireless communication device and the cellular network and resources can be flexibly scheduled on channels associated with the data connection, thereby facilitating the transmission of data between the wireless communication device and the network.

Often, the idle mode is associated with a discontinuous reception (DRX) cycle. Here, according to a timing configuration of the DRX cycle, the wireless interface of the wireless communication device transitions back and forth between the inactive state and the active state. This gives the cellular network the opportunity to transmit the paging signal to the wireless communication device in accordance with the DRX cycle. The DRX cycle can have ON-durations during which the wireless interface operates in the active state; and OFF-durations during which the wireless interface of the wireless communication device operates in the inactive state. The ON-durations of the DRX cycle are associated with so-called paging occasions (POs), because the network has the opportunity to transmit one or more paging signals to the wireless communication device.

While the wireless communication device is in connected mode, its location may be known by the network at cell level (i.e. on a cell granularity). However, it is possible that—due to device mobility—the wireless communication device moves between cells of the cellular network while operating in the idle mode. This is sometimes referred to as changing the cell of the cellular network on which the wireless communication device is camping.

However, while the wireless communication device is in idle mode, its location is known by the network at paging area level, instead of cell level. A respective paging area typically includes multiple cells of the cellular network and paging signals are transmitted in the cells of the paging area. Thereby, the likelihood of successful transmission of the paging signal to the wireless communication device can be increased, even in view of possible device mobility. In the framework of the 3rd Generation Partnership Project (3GPP) 4G and 5G protocols, one implementation of a paging area is a so-called Tracking Area (TA).

An operator may define a group of neighbor cells as a TA. Such grouping may be performed at the initial deployment of the network. A TA can be defined by cells or network nodes (e.g. base stations, BS) assigned to the TA, e.g. base stations like eNB 3GPP 4G or gNB in 3GPP 5G. The TA is defined with a Tracking Area Code (TAC) and a Public Land Mobile Network Identifier (PLMN ID) comprising a Mobile Country Code (MCC) and Mobile Network Code (MNC) together creating the device global unique Tracking Area Identifier (TAI).

If there is data traffic heading to a wireless communication device in idle state (e.g. if someone sends a text message to a wireless communication device), the network can wake up the wireless communication device so that it can receive the data. This "waking up", called paging, is performed TA-wide. For example, a wireless communication device is located in a TA comprising a plurality of cells. Further, the network considers the wireless communication device is located in this TA. When the network wakes up the wireless communication device as some data for the wireless communication device is being received, it sends a paging message to the base stations (BS) or cells in this TA. Then the BS broadcasts the paging message over the radio link to wake up the wireless communication device. A wireless communication device in idle state wakes up at certain periods to check for a paging message to see if there is any incoming data. If the wireless communication device finds it has been paged by a BS or cell, it turns back to the active state to receive the data. For example, the paging may start in one or a few cells of the paging area. One or more paging signals may be transmitted. When the wireless communication device does not respond to the paging within a pre-defined time, the paging may be escalated to a larger set of cells in a number of steps, depending on implementation. The time between these escalations where cells are added may be controlled based on a paging discard timer.

The network (e.g. a mobility management function of the network) needs to have updated location information about wireless communication devices in idle state to find out in which TA a particular wireless communication device is located. For this, the wireless communication device notifies the network of its current location by sending a Tracking Area Update (TAU) Request message every time it moves between TAs.

In detail, a wireless communication device may obtain a TAI List (TAL) when it attaches to a network. This list shows the tracking areas where the network believes a wireless communication device is located and within which the wireless communication device can travel without TAU. This means the wireless communication device does not have to send a TAU Request message to the network as long as it stays in the listed TAs, but it has to send a TAU Request message to the network when it moves to a new TA other than the TAs of the TAL. The network is supposed to provide the wireless communication device with a new TAL.

A wireless communication device in idle state may send a TAU Request message to the network periodically even when the wireless communication device stays within a TA in the TAL. If a wireless communication device in idle state has stayed in one location (or moved within the TAs in the TAL) and has not notified the network of its current location, the network may not know whether the wireless communication device is still in idle state, or is not able to communicate. Therefore, the wireless communication device, even when the TA is not changed, may send TAU Request messages to the network periodically to announce that it is still present and able to receive paging messages and data. Otherwise, the network may believe the wireless communication device is not able to receive data and does not perform paging even when there is data traffic heading to the wireless communication device.

Mobility originated TAU can be a significant or large contributor to power consumption if TAs are set to geographically smaller sizes. A TAU may be of different types, for example:
  i. Mobility originated TAU, when the wireless communication device enters a TA, i.e. a cell belonging to a TA, which is not in the TAI list.
  ii. Periodic TAU when a timer (for example T3412 in 3GPP 4G) triggers the update.
  iii. Network initiated load balancing.
  iv. When the wireless communication device changes its capability information or other information e.g. DRX configurations or when settings in the network are changed.

In particular LTE (Long Term Evolution) for M2M (Machine-to-Machine) communications (LTE-M) and Narrowband Internet of Things (NB-IoT) use DRX cycles and the technique of repetitions to improve coverage. Repetitions may also be used for transmitting TAU Request messages. However, the modem-on-time increases drastically when repetitions are used and thereby the power consumption.

SUMMARY

For example, when the wireless communication device is moving, it may detect that a paging or tracking area update is required upon entering a new tracking or paging area. However, at the border or outer area of the new paging area, communication quality between the wireless communication device and a network node of the new paging area may be poor. This may require increased transmission power and/or a high number of repetitions to improve reception reliability and quality at the network node. Accordingly, there is a need for advanced techniques of updating paging and tracking areas for paging operations.

This need is met by the features of the independent claims. The features of the dependent claims define embodiments.

A method of operating a wireless communication device connectable to a cellular network is provided. The cellular network includes a plurality of cells. The method includes receiving, from the cellular network, configuration information for delaying a transmission of a paging area update request that triggers a paging area update of a paging area of a paging operation of the wireless communication device. According to the method, while the wireless communication device is operating in a disconnected mode associated with the paging operation, the wireless communication device may determine that the paging area update is required. Upon determining that the paging area update is required, the transmission of the paging area update request is delayed in accordance with the configuration information.

By delaying the transmission of the paging area update request, the wireless communication device may move closer to the network node of the new paging area and may therefore reduce the number of repetitions of the transmissions of the paging area update request as well as the transmission power of each of the transmissions of the paging area update request. This may reduce power consumption of the wireless communication device which may be in particular beneficial for a battery-powered wireless communication device. Further, delaying the transmission of paging area update request may reduce ping pong effects when the wireless communication device is moving back and forth between two paging areas, i.e. delaying the transmission of paging area update request may result in a hysteresis for reducing transmissions of paging area update requests.

According to various examples, the configuration information may indicate a paging discard timer associated with a length of a paging escalation sequence of the paging operation. For example, the wireless communication device may delay the transmission of the paging area update request up to, but no longer than the paging discard timer. For example, the transmission of the paging area update request is delayed at most until expiry of the paging discard timer. Thus, paging signals may not be missed by the wireless communication device when transitioning from one paging area to another.

In various examples, the configuration information is indicative of whether a current paging area in which the wireless communication device is currently located overlaps at least partly a neighboring paging area adjacent to the current paging area. For example, the configuration information may indicate a cell which is defined to belong to the neighboring paging area, but not to the current paging area. In this cell, paging signals are to be transmitted to the wireless communication device without updating the tracking area of the wireless communication device. In other words, this cell does formally not belong to the current paging area at which the wireless communication device is registered. The term "a cell does formally not belong to a paging area" can generally mean that this cell is not assigned to that paging area and thus the paging area information provided to the wireless communication device registered at this paging area—e.g., as part of a paging area update message—does not include the cell as a cell of this paging area. For example, where there is a list of cells used for configuring a paging area at the wireless communication device, the list of cells may not include such cells. Consequently, a wireless communication device which is registered at a current paging area enters a cell which does formally not belong to that current paging area may recognize that it has entered a new neighboring paging area and will register at this new neighboring paging area by transmitting a paging area update request.

The configuration information indicating the cell that does formally not belong to the current paging area may be received from a network node of the current paging area, e.g., in a broadcasted information block. For example, in this indicated cell paging signals for the wireless communication device may be transmitted although this cell does formally not belong to the current paging area at which the wireless communication device is registered (thus, the cell extends the paging area beyond the initial configuration that is provided, e.g., as part of a paging area update message). The paging signals may be transmitted in this indicated cell by a network node which belongs to the neighboring paging area, but not to the current paging area. As a result, the wireless communication device may receive paging signals in this cell without having transmitted a paging area update request. Thus, transmitting the paging area update request may be delayed. It is to be noticed that in this cell also paging signals for wireless communication devices registered at the neighboring paging area may be transmitted. In other words, a network node assigned to this cell, although defined to belong to the neighboring paging area only, may transmit paging signals for wireless communication devices being registered at the current paging area and the neighboring paging area.

Other implementations of the overlap between the current paging area and the neighboring paging area are conceivable. For example, it would be possible that there are one or more cells that are included in both paging areas—i.e., typically arranged at the circumference of the paging areas. In such an example, it would be possible that the configuration information indicates such a cell which is defined to belong to the current paging area, as well as the neighboring paging area. For instance, a respective indicator flag may be broadcasted. Consequently, the wireless communication device which is registered at the current paging area enters such a cell which formally belongs to, both, the current paging area and the neighboring paging area and recognizes that it can request a paging area update to the neighboring paging area—even though still being located in the current paging area.

As a result of the overlap, paging signals may be reliably received at the wireless communication device, in particular in case a transmission quality is poor at the edge of cells of neighboring paging areas.

The configuration information may indicate whether a current paging area overlaps a neighboring paging area by indicating that the most nearby cells of the current paging area represent overlap cells or by a list of overlap cells. Furthermore, when tracking area lists are configured, the configuration information may indicate that the closest tracking areas of another tracking area list may act as overlapping tracking areas, i.e. support, at least partially, the transmission of paging signals for the wireless communication device which is still registered at the tracking area from which it comes.

In further examples, a cell of the current paging area may at least partly overlap a cell of the neighboring paging area. For example, the transmission of the paging area update request is selectively delayed if the configuration information indicates that the current paging area overlaps the neighboring paging area. When the paging areas are overlapping, the wireless communication device, when moving from one area to another area, may still receive paging signals from the one area from which the wireless communication device is coming. Thus, by knowing that the paging areas are overlapping, the wireless communication device may delay the transmission of the paging area update request without missing paging signals during transitioning from the one area to the other area.

In various examples, the method may further comprise measuring a received power of a downlink reference signal, for example measuring a received power of the downlink reference signal transmitted from a network node of the area which the wireless communication device has entered, i.e. the new paging area. The transmission of the paging area update request is delayed until the received power fulfills a power condition. In other words, the delaying of the transmission of the paging area update request may be aborted as soon as sufficient communication quality between the wireless communication device and the network node is achieved.

The received power may be repeatedly measured while delaying the transmission of the paging area update request. A repetition rate of said repeated measuring of the received power may be determined based the paging discard timer associated with the length of the paging escalation sequence of the paging operation, or a mobility level of the wireless communication device. The mobility level may indicate for example a speed of the wireless communication device or one or more location indications of the wireless communication device. The wireless communication device may enter a sleep mode or a reduced power consumption mode between the repeated measurements. The repetition rate may be a rate of measurements performed to fulfill standardized requirements or requirements defined by a network provider. For example, the received power may be measured in the current cell every DRX cycle when the wireless communication device is checking for paging.

The configuration information may indicate the power condition. For example, the power condition may indicate a power level threshold. By including the power condition in the configuration information, the network may control the delay.

According to various examples of, the method further comprises determining a repetition level of the transmission of the paging area update request based on the received power of the reference signal.

The configuration information may indicate whether said delaying of the transmission of the paging area update request message is allowed.

The method may further comprise entering a sleep state while delaying the transmission of the paging area update request. Thus, the power consumption of the wireless communication device may be reduced.

The configuration information may be at least partly received when operating in a connected mode, prior to a transition to the disconnected mode. For example, the configuration information is at least partly included in a connection deactivation message triggering the transition to the disconnected mode. Furthermore, the configuration information may be at least partly included in a broadcasted system information block.

A computer program or a computer program product or a computer-readable storage medium includes program code that can be loaded from a memory and executed by at least one processor. Executing the program code causes the at least one processor to perform a method of operating a wireless communication device connectable to a cellular network is provided. The cellular network includes a plurality of cells. The method includes receiving, from the cellular network, configuration information for delaying a transmission of a paging area update request that triggers a paging area update of a paging area of a paging operation of the wireless communication device. When the wireless communication device is operating in a disconnected mode associated with the paging operation, according to the method, the wireless communication device may determine that the paging area update is required. Upon determining that the paging area update is required, the transmission of the paging area update request is delayed in accordance with the configuration information.

A wireless communication device connectable to a cellular network is provided. The cellular network includes a plurality of cells. The wireless communication device includes control circuitry. The control circuitry is configured to receive, from the cellular network, configuration information for delaying a transmission of a paging area update request that triggers a paging area update of a paging area of a paging operation of the wireless communication device, to determine that the paging area update is required, when operating in a disconnected mode associated with the paging operation, and to delay the transmission of the paging area update request in accordance with the configuration information upon determining that the paging area update is required.

A method of operating a node of a cellular network comprising a plurality of cells is provided. The method comprises transmitting, to a wireless communication device, configuration information for delaying a transmission of a paging area update request that triggers a paging area update of a paging area of a paging operation of the wireless communication device. The method furthermore comprises, when the wireless communication device operates in a disconnected mode associated with the paging operation, performing the paging operation in accordance with the configuration information.

According to various examples, the configuration information is indicative of a paging discard timer associated with a length of a paging escalation sequence of the paging operation.

According to further examples, the configuration information is indicative of whether a current paging area in which the wireless communication device is currently located overlaps a neighboring paging area adjacent to the current paging area. For example, the configuration information may be indicative of a cell which is not defined to belong to the current paging area. Instead, this cell is defined to belong to the neighboring paging area and is arranged at a border of the neighboring paging area adjacent to the current paging area. According to the method, a paging signal for the wireless communication device may be transmitted in this cell. In other words, although this cell belongs to the neighboring paging area and formally not to the current paging area, paging signals for the wireless communication device are transmitted in this cell without registering the wireless communication device at the neighboring paging area. Thus, this cell represents an "overlap" of the current paging area and the neighboring paging area. As a result, when the wireless communication device enters this cell it may receive paging signals without transmitting a paging area update request. Thus, the transmission of the paging area update request may be delayed. However, when the device moves further into the neighboring paging area, a paging area update request has to be transmitted as the other cells of this neighboring paging area may not transmit paging signals for the wireless communication device.

The configuration information may further indicate a power condition to be used by the wireless communication device. The power condition may be used by the wireless communication device to delay the transmission of the paging area update request until a received power of a downlink reference signal measured at the wireless communication device fulfills the power condition.

The configuration information may be indicative of whether said delaying of the transmission of the paging area update request message is allowed.

The configuration information may be at least partly transmitted when the wireless communication device operates in a connected mode, prior to a transition to the disconnected mode. For example, the configuration information is at least partly included in a connection deactivation message triggering the transition to the disconnected mode. Furthermore, the configuration information may be at least partly included in a broadcasted system information block.

A computer program or a computer program product or a computer-readable storage medium includes program code that can be loaded from a memory and executed by at least one processor. Executing the program code causes the at least one processor to perform a method of operating a node of a cellular network comprising a plurality of cells. The method comprises transmitting, to a wireless communication device, configuration information for delaying a transmission of a paging area update request that triggers a paging area update of a paging area of a paging operation of the wireless communication device. The method furthermore comprises, when the wireless communication device operates in a disconnected mode associated with the paging operation, performing the paging operation in accordance with the configuration information.

A node of a cellular network is provided. The cellular network comprises a plurality of cells. The node comprises control circuitry configured to transmit, to a wireless communication device, configuration information for delaying a transmission of a paging area update request that triggers a paging area update of a paging area of a paging operation of the wireless communication device, and to perform the paging operation in accordance with the configuration information when the wireless communication device operates in a disconnected mode associated with the paging operation.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
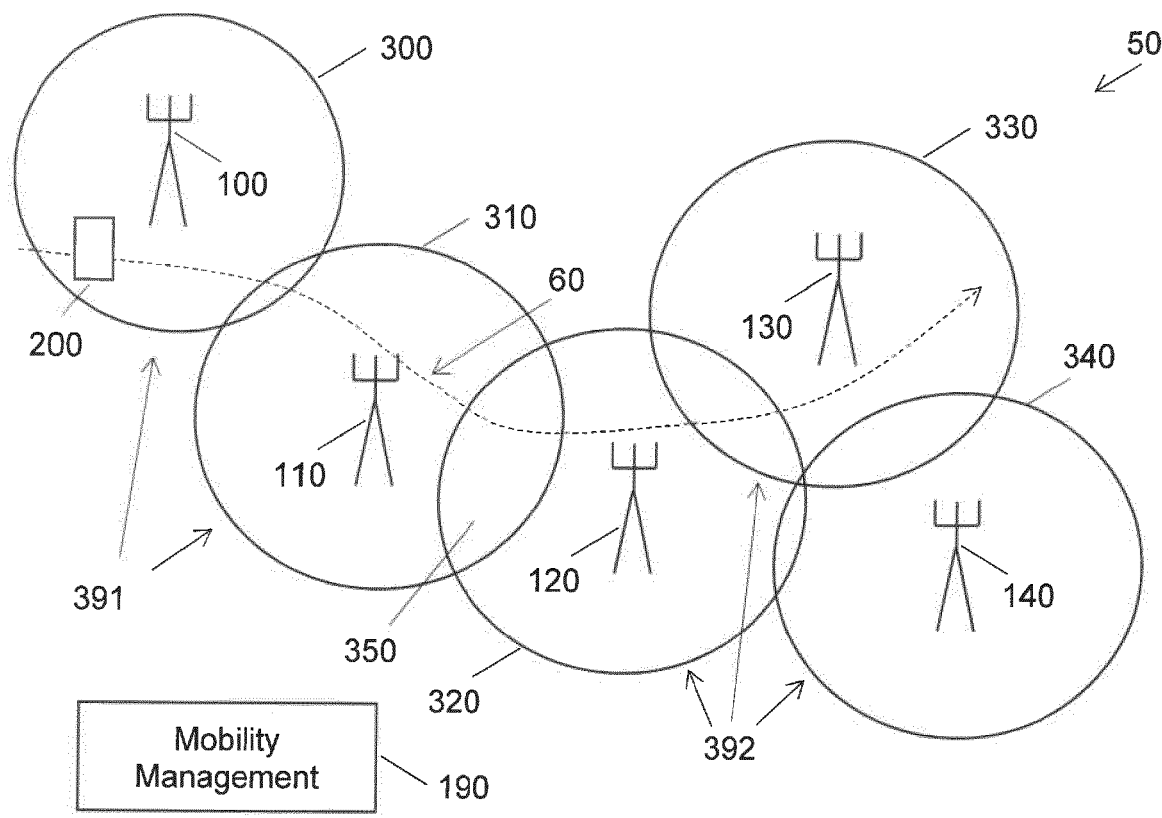
FIG. 1 schematically illustrates a cellular network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various aspects relate to a communication system. For example, the communication system may be implemented by a wireless communication device, for example a terminal or user equipment (UE), and a network node, for example an access node of a communication network. For example, the access node may be implemented by a base station (BS) of a cellular network. Exemplary network architectures include the 3GPP Long Term Evolution (LTE) 4G or New Radio (NR) 5G architecture. Hereinafter, for sake of simplicity various examples will be described in connection with an implementation of the communication system by a wireless communication device connectable to a cellular network. However, similar techniques may be readily employed for other kinds and types of communication systems.

The cellular network may provide a wireless link between the wireless communication device and the network node. Downlink (DL) signals may be transmitted by the network node and received by the wireless communication device. Uplink (UL) signals may be transmitted by the wireless communication device and received by the network node.

Techniques are described which facilitate operation of a wireless communication device in an idle mode. In the idle mode, a data connection between the wireless communication device and the cellular network is not maintained. This helps to reduce the energy consumption of the wireless communication device. This is helpful, inter alia, for Machine Type Communication (MTC) or Internet of Things (IoT) devices that typically have a limited battery capacity. Also other devices may benefit from operation in the idle mode. When operating in the idle mode, the wireless communication device can typically employ a DRX cycle including OFF-durations and ON-durations. During the OFF-durations, a wireless interface of the wireless communication device can be in an inactive state. For example, a modem of the wireless interface may be unfit to receive any data in the inactive state. Thereby, the energy consumption can be reduced. The ON-durations can correlate with paging occasions (POs) during which the modem can receive paging signals.

Various examples described herein relate to mobility management of a wireless communication device. In particular, various techniques relate to idle-mode mobility management. Mobility management may include additional entities in the network, for example one or more mobility management nodes connected to the network nodes, for example a Mobility Management Entity (MME) according to LTE or an Access and Mobility management Function (AMF) according to NR 5G.

As a general rule, the idle-mode mobility management may include various aspects related to managing the communication between the cellular network and the wireless communication device. To give a few examples, the idle-mode mobility management may include: determining a paging area; updating a paging area; configuring location updates from the wireless communication device.

According to various examples described herein, it is possible to determine a paging area for the wireless communication device.

A paging area can include multiple cells of the cellular network. A paging area can define a certain area in which paging signals are transmitted to the wireless communication device. Paging signals that trigger the transition from the operation of the wireless communication device in the idle mode towards the operation of the wireless communication device in a connected mode can be transmitted in multiple cells that form the paging area. Thereby, device mobility can be accounted for, by transmitting the paging signals not only in a single cell (having a comparably limited spatial extent), but rather by transmitting the paging signals across the entire paging area, e.g., upon receiving a paging-request message from a core of the cellular network and/or upon DL data for the wireless communication device being available in the DL transmit buffer of the cellular network.

There are various implementations conceivable for the paging area. Some of these examples are listed in the Table 1 below.

TABLE 1

Examples of paging areas in the prior art.

| Example | Paging area implementation | Description in prior art |
|---|---|---|
| 1 | Tracking area | See, e.g., 3GPP TS 24.301 V16.0.0 (2019 March). A unique identity (TA identifier, TAI) for each TA can be provided, e.g., by a TA code (TAC), e.g., together with a Mobile country code (MCC) and Mobile network code (MNC), together forming a public land mobile network identifier (PLMN ID). TA can be used when operating in an idle mode implemented by RRC_idle. Paging in idle mode is in 3GPP systems triggered by the core network (CN). |
| 2 | Tracking area list (TAL) | See, e.g., 3GPP TS 23.401 V16.0.0 (2018 September). The TAL can include multiple TAs. The TAL can be specifically configured for each device. The TAL can then be implemented by multiple listed TA identifiers. TAL can be used when operating in an idle mode implemented by RRC_idle. Paging can be triggered by the CN. |
| 3 | Radio access network based Notification Area (RNA) | See, e.g., 3GPP TS 38.304 V15.5.0 (2019 September). RNA can be used when operating in an idle mode implemented by RRC_inactive. Paging is triggered by the RAN. |

According to various examples described herein, the paging area can be updated. This can include communicating a paging area update request message from the wireless communication device to the network. An example of a paging area update request message is the tracking area update (TAU) request message used by 3GPP networks, see Table 1. I.e., it is possible to re-determine the paging area for the wireless communication device over the course of time. The paging area update can also include a DL paging area update response message. The DL paging area update response message can be implemented by a TAU Accept message used by 3GPP networks, see Table 1. The paging area update can be triggered if the UE detects that it leaves the paging area currently configured. Then, the wireless communication device can transmit the TAU request message.

According to various examples described herein, the idle-mode mobility management may be executed per wireless communication device. For instance, different paging areas may be determined for different wireless communication devices, even though the wireless communication devices have the same location or are located within the same cell of the cellular network. Device-specific paging areas can be determined. Device-specific mobility management is generally possible.

In this description, reference is primarily made to tracking areas (TA) and TA-related terms, functions and definitions, for example tracking area update (TAU) request and a tracking area update (TAU) accept. However, the methods and operations described herein may be applied in an analogous way to other types of paging areas, for example the above mentioned radio access network based notification area (RNA).

As a general rule, there are various trigger criteria available for triggering a TAU. For example, as indicated above, a TAU may be triggered when the wireless communication device enters a new tracking area. It would also be possible to use a timing scheme to trigger the TAU. For instance, a timer at the wireless communication device and/or at the network may trigger the TAU upon expiry. Another trigger criterion would be load-balancing of a mobility-control node, e.g., to assign roughly the same number of tasks to each paging or tracking area. Yet another trigger criterion would be capability changes of the wireless communication device or changes to the DRX cycle. In a specific example, the TAU is initiated by a wireless communication device sending the "TAU Request", 3GPP TS 23.401. A TAU can be of different types which are summarized below, for further details see 3GPP TS 24.301 (NAS): (i) Mobility originated TAU, when the wireless communication device enters a TA, i.e. cell belonging to a TA, not in TAL. (ii) Periodic TAU when timer T3412 triggers the update. Note, this timer already is made possible to set to a higher value for MTC devices (Section 4.3.17.3 of TS 23.401). (iii) Mobility Management Entity (MME) initiated load balancing. (iv) When the wireless communication device changes its capability information or other information e.g. DRX configurations or when the network changes mode/settings.

Transmitting a TAU request may include the techniques of repetitions to improve coverage. For example, subsequent repetitions of the same uplink data transmitted from the wireless communication device may be received and aggregated at the network node. The resulting signal to noise ratio after the aggregation may be improved. The same uplink data may be transmitted several times from the wireless communication device, for example 2 times, 4 times, 8 times, 16 times or more than 16 times, even more than 100 times.

LTE-M and NB-IoT in particular uses the technique of repetitions to improve coverage. Repetitions will be used for the different physical channels. However, the modem-on-time increases drastically when repetitions are used and thereby the power consumption. This is also the case for TAU request messages. It may be noticed that transmit operations may consume significantly more power than receive operations.

Therefore, in particular, mobility originated tracking area updates may be a dominating contributor to power consumption of the wireless communication device if tracking areas are set to geographically small sizes.

Various techniques are based on the finding that in particular a wireless communication device, when moving from a first tracking area to a second tracking area, may be in poor coverage at the borders of the tracking areas and may need to perform a large number of repetitions and may need to use a high transmission power for improving communication with the network, for example for registering at a cell of the second tracking area and requesting a tracking area update.

According to various examples, for avoiding a large number of repetitions, the wireless communication device may postpone or delay requesting a tracking area update. Assuming that the wireless communication device, after leaving the first tracking area, is moving closer to a network node of the second tracking area, a delayed TAU request transmission may require a lower number of repetitions than a TAU request transmitted directly upon detecting the second tracking area and leaving the first tracking area. For example, for delaying the transmission of the TAU request, the wireless communication device may consider timing conditions of paging signals and/or an overlap of tracking areas such that missing a paging signal may be avoided.

FIG. 1 schematically shows a cellular network 50 comprising a plurality of cells 300 to 340. The cellular network 50 may be a network type according to 3GPP 4G or 3GPP 5G architectures. However, while FIG. 1 and further parts of the following description illustrate techniques in the 3GPP 5G and 3GPP 4G framework of a cellular network, similar techniques may be readily applied to other communication techniques and protocols, for example cellular and non-cellular wireless systems, for example an IEEE Wi-Fi technology.

To each cell 300 to 340 a corresponding network node 100 to 140 is assigned, i.e. networking node 100 is assigned to cell 300, network node 110 is assigned to cell 310, network node 120 is assigned to cell 320, network node 130 is assigned to cell 330 and network node 140 is assigned to cell 340. The network nodes 100 to 140 may comprise radio access nodes of the network 50, for example base stations like eNB in 3GPP 4G or gNB in 3GPP 5G technologies.

The cellular network 50 also includes one or more mobility management nodes 190, for example implemented by an Access and Mobility Management Function (AMF) or Mobility Management Entity (MME). The mobility management node 190 provides one or more of the following functionalities: connection management sometimes also referred to as registration management; connection management; reachability management; mobility management; connection authentication; and connection authorization. For example, the mobility management node 190 controls paging of a wireless communication device, if the respective wireless communication device operates in the idle mode. The mobility management node 190 may trigger transmission of paging signals, including a paging indicator and a paging message, to the wireless communication device; this may be time-aligned with POs. The mobility management node 190 may determine TAs or TALs. The mobility management node 190 may be configured to determine the TA or TAL when performing a TAU.

The network nodes 100 to 140 may be connected to the mobility management node 190, e.g. via wired or wireless connections.

In the network 50 a plurality of tracking areas (TAs) may be defined, for example by the mobility management node 190. As an example, a first tracking area 391 may be defined to include cells 300 and 310. A second tracking area 392 may be defined to include cells 320, 330 and 340.

One or more wireless communication devices may be operated in the network 50. An exemplary wireless communication device 200 is shown in FIG. 1. In the scenario of FIG. 1, the wireless communication device 200 is connectable to the cellular network 50. The wireless communication device 200 may be a terminal device or a user equipment (UE), for example one of the following: a cellular phone; a smart phone; an IOT device; a Machine Type Communication (MTC) device; a sensor; an actuator; etc. The wireless communication device 200 may be a movable device which is traveling along a path 60.

When operating in a connected mode, a data connection between the wireless communication device 200 and the network 50 is set up. A wireless interface of the wireless communication device 200 may persistently operate in an active state, or may implement a DRX cycle including periodic switching between the active state and an inactive state.

To achieve a power reduction, it is possible to implement an idle mode. Here, the wireless communication device 200 typically operates in accordance with the DRX cycle. The wireless interface of the wireless communication device 200 can be transitioned into an inactive state. The data connection with the network 50 is released. Paging signals are transmitted in one or more TA(s) to transition the wireless communication device 200 back into the connected mode, using a radio access (RA) procedure. The idle mode could be implemented, e.g., by RRC_Inactive or RRC_Idle according to the 3GPP protocol.

Figure 2:
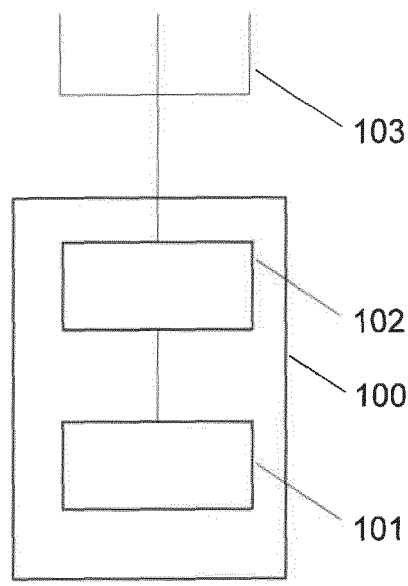
FIG. 2 schematically illustrates a network node according to various examples.

FIG. 2 shows the network node 100 in more detail. The other network nodes 110 to 140 may have a same or similar architecture as network node 100. The network node 100 comprises control circuitry 101 and a transceiver 102 coupled to an antenna 103. The network node 100 may comprise more components which are not shown in the figure for clarity reasons. For example, the network node 100 may comprise a further interface for communicating with the mobility management node 190. The control circuitry 101 may comprise a controller or a processing unit configured to execute program code, for example software, to perform the operations and methods described below in connection with FIGS. 4, 5 and 7.

Figure 3:
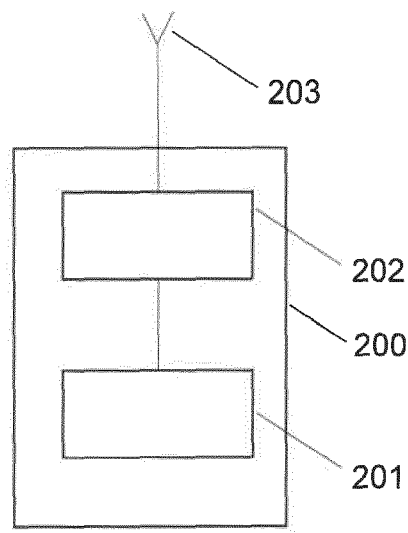
FIG. 3 schematically illustrates a wireless communication device according to various examples.

FIG. 3 shows the wireless communication device 200 in more detail. The wireless communication device 200 comprises control circuitry 201 and a transceiver 202 coupled to an antenna 203. The wireless communication device 200 may comprise more components which are not shown in the figure for clarity reasons. For example, the wireless communication device 200 may comprise a user interface for communicating with a user of the wireless communication device 200. The control circuitry 201 may comprise a controller or a processing unit configured to execute program code, for example software, to perform the methods described below in connection with FIGS. 4, 5 and 6.

Figure 4:
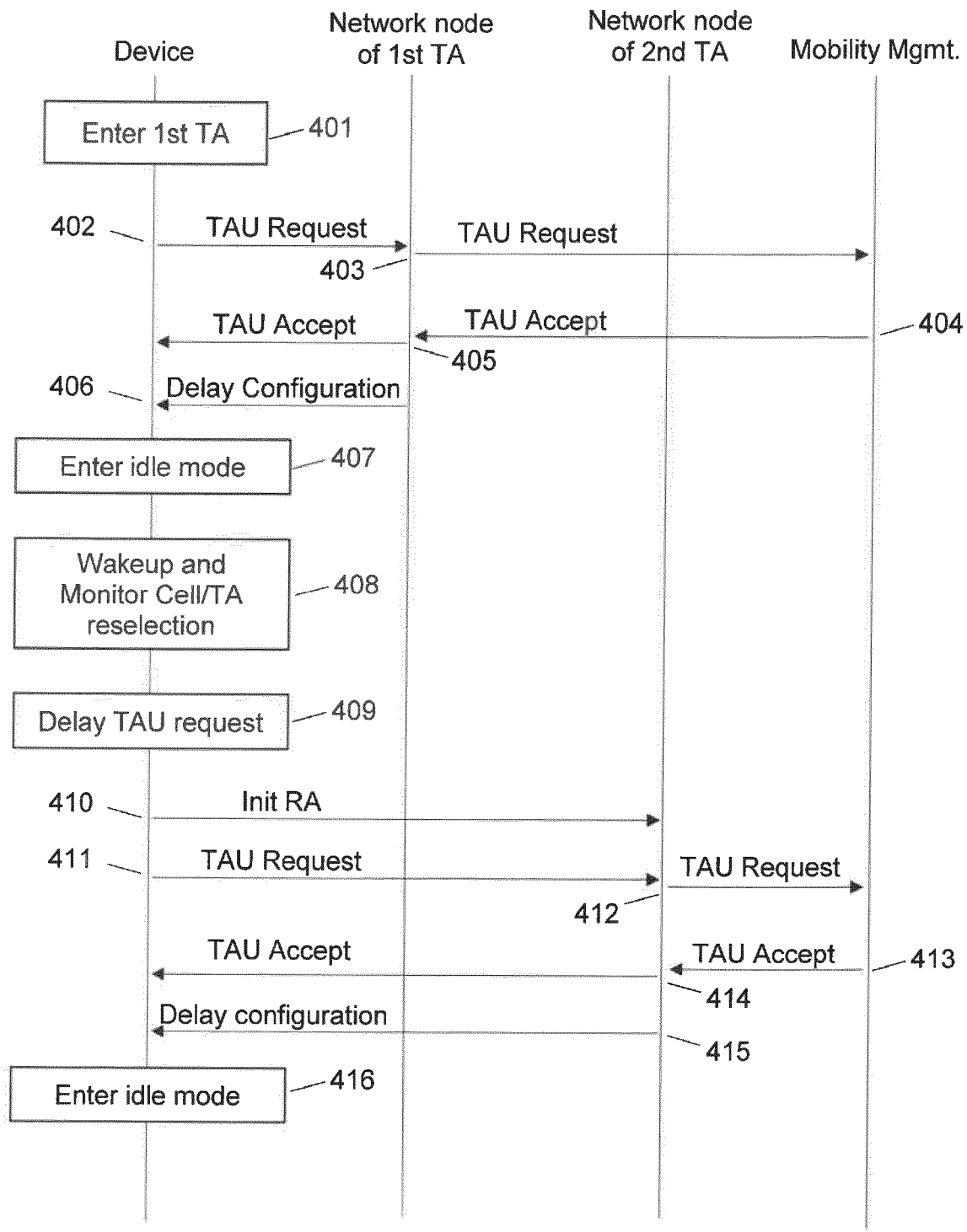
FIG. 4 schematically illustrates operation of the wireless communication device and the network node according to various examples.

FIG. 4 schematically shows exemplary operations of the wireless communication device 200, the network nodes of the first and second tracking areas 391 and 392, and the mobility management node 190.

At 401, the wireless communication device 200 may enter the first tracking area 391 by entering cell 300. The current tracking area list (TAL) which is currently configured in the wireless communication device 200 may not include cell 300. Therefore, the wireless communication device 200 may transmit, at 402, a tracking area update (TAU) request to the network 50, in particular to network node 100 of cell 300. At 403, the network node 100 may forward the TAU request to the mobility management node 190, which in turn may accept the tracking area update request and may transmit, at 404, a corresponding TAU accept message to the network node 100. The network node 100 forwards the TAU accept message at 405 to the wireless communication device 200. The TAU accept message may include a tracking area list (TAL) indicating that cells 300 and 310 belong to the first tracking area 391. Additionally, the network node 100 may transmit at 406 a configuration information to the wireless communication device 200 which includes information for delaying a transmission of a future tracking area update request when the wireless communication device 200 determines that a tracking area update is required in the future. In the following, the configuration information concerning the delaying of the transmission of the TAU request will also be called shortly delay configuration.

The delay configuration may be included in the TAU accept message or may be comprised in a separate message. The delay configuration may be included at least partially in a connection deactivation message triggering a transition of the wireless communication device 200 in a disconnected mode. The delay configuration may be included at least partly in a broadcasted system information block. The delay configuration information may generally indicate, whether a delaying of a transmission of a tracking area update request message is allowed when the wireless communication device 200 determines that a TAU request is required, for example when the wireless communication device 200 leaves the first tracking area 391 and enters another tracking area, for example the second tracking area 392. In particular, the delay configuration may indicate whether the current tracking area 391 in which the wireless communication device 200 is currently located overlaps a neighboring tracking area, for example the adjacent second tracking area 392. Furthermore, the delay configuration information may indicate a paging discard timer associated with the length of paging escalation sequence of a paging operation in the network 50.

A delaying of the transmission of the paging area update request may be based on the paging discard timer, a default paging cycle used in the network node 100, and T3-RESPONSE and T3413/T3415 network timers.

For example, according to 3GPP TS 29.274, a timer, denoted T3-RESPONSE, shall be started when a signaling message (for which a reply is expected) is sent. A signaling message or the triggered message has probably been lost if a reply has not been received before the T3-RESPONSE timer expires. Once the T3-RESPONSE timer expires, the message corresponding to the T3-RESPONSE timer is then retransmitted if the total number of retry attempts is less than N3 REQUESTS times. T3-RESPONSE timer and N3 REQUESTS counter setting may be implementation dependent. That is, the timers and counters may be configurable per procedure. Further, to initiate paging, the mobility management node 190 may request the network nodes to start paging and may start a timer T3413 or T3415. Timer T3415 may be started, if the network uses enhanced DRX for the mobile communication device and otherwise T3413. If the mobility management node 190 starts timer T3415, timer T3415 may be set to a value smaller than the value of timer T3-RESPONSE. The network nodes try to send the paging message during a period specified by the paging discard timer, after which the paging message is discarded. The paging discard timer may be set equal or less than T3413 or T3415. To guarantee at least one retransmission attempt, the paging discarded timer may be set to a larger value than the default paging cycle.

For example, the paging may start in one or a few cells of a paging area. One or more paging signals may be transmitted. When the wireless communication device does not respond to the paging until expiry of the paging discard timer, the paging may be escalated to a larger set of cells in a number of steps according to the paging escalation sequence.

The paging discard timer may be set to the time between the start of a paging at one paging escalation level until a next paging escalation level is entered. E.g., when the paging is started in one or a few cells, then the paging discard timer is the time until the paging is escalated to a larger number of cells. Then the same timer may be used until the paging is escalated to further cells and finally the entire paging area. Thus, with every level, the paging escalation sequence increases the probability that the wireless communication device detects a paging signal from the network.

The paging discard timer may be set to many seconds. The paging discard timer may in many cases trigger faster than a wireless communication device will get close to a cell center of the neighbor cell. For example, if a distance to a cell center is 5 km, it will take 3 minutes to get to center if traveling at 100 km/h. Although the paging discard timer is commonly not in the range of a minute or more, traveling for nearly the time of the paging discard timer may increase transmission and/or reception quality in the new cell significantly.

For example, as a general rule, in the network 50, a paging signal may be transmitted for contacting a wireless communication device registered at the network 50 and for setting the wireless communication device in an active state for receiving data from the network 50. The paging signal may be broadcasted in each of the cells assigned to the tracking area to which the wireless communication device is currently assigned, for example based on the previous tracking area update request. The network 50 may transmit the paging signal and may repeat transmitting the paging signal until either the addressed wireless communication device responds to the paging signal (e.g. by initiating a connection with the network 50) or until a predefined paging discard timer expires. The paging signals may be repeatedly transmitted based on a paging timer, i.e. an interval between the transmissions of two paging signals is determined by the paging timer. The paging discard timer may be significantly larger than the paging timer, for example the paging discard timer may have a value of a multiple of the value of the paging timer. In every level of the paging escalation sequence paging signals may repeatedly be transmitted until the paging discard timer expires. Thus, a length of the paging escalation sequence of the paging operation may be a multiple of the value of the paging discard timer. According to the paging escalation sequence, the network 50 may consider that the wireless communication device is not reachable anymore within the tracking area upon expiry of the paging discard timer in the last level of the paging escalation sequence.

For example, in a case in which the paging escalation sequence comprises a single level only, e.g. in this single level paging signals may be transmitted in every cell assigned to the paging, the length of the paging escalation sequence may essentially correspond to the length of the paging discard timer.

After having received the TAU accept and the delay configuration, the wireless communication device 200 may enter at 407 an idle mode. For example, the wireless communication device 200 may enter a discontinuous reception (DRX) cycle according to 3GPP 4G and 5G technologies. DRX is a technique that allows the wireless communication device 200 to power down significant amounts of its internal circuitry for a high percentage of the time when it is in the idle mode. The period of time when the wireless communication device will be powered down is commonly called inactive state or sleep mode. In DRX mode, the wireless communication device 200 may periodically switch between an active state and the inactive state. The duration of the active state is commonly significantly shorter than the duration of the inactive state. DRX feature depends on the network configuration. If the feature is activated by the network, in the active state, the wireless communication device 200 will only read some of available paging blocks, depending on parameters defined in broadcasted system information. If no paging block has to be read, the wireless communication device will be able to go to the inactive state, increasing the battery life of the wireless communication device.

At 408, the wireless communication device 200 may wake up, i.e. transition from the inactive state to the active state according to DRX cycle, and may monitor whether a cell reselection or a tracking area reselection is required. For example, when the wireless communication device 200 travels along the path 60, the wireless communication device 200 may leave the cell 300 and may enter cell 310. As cell 310 belongs to the same first tracking area 391, a tracking area reselection is not required. However, when the wireless communication device 200 travels further along the path 60, it may leave cell 310 and may enter cell 320 which is not listed in the current tracking area list configured in the wireless communication device 200. At the wireless communication device 200, this may trigger that a tracking area update is required. However, due to the delay configuration received at 406, the wireless communication device 200 may not immediately transmit the TAU request, but may delay the transmission of the TAU request at 409.

For example, the delay configuration may have indicated the paging discard timer. Based on the paging discard timer, the wireless communication device 200 may delay the TAU request transmission, but such that the paging discard timer does not expire. For example, the wireless communication device 200 may determine a timer value which expires shortly, for example a few milliseconds or seconds, before the paging discard timer expires. Then, the wireless communication device 200 may delay the transmission of the TAU request until this timer expires. During delaying the transmission of the TAU request, the wireless communication device 200 may continue switching between the active state and the inactive state according to the DRX cycle. Furthermore, during delaying the transmission of the TAU request, the wireless communication device 200 may monitor a received power of a downlink reference signal from the (new) cell 320. For example, the received power of the downlink reference signal may be measured repeatedly while delaying the transmission of the TAU request. A repetition rate of the repeated measuring of the received power may be based on the value of the paging discard timer and/or a mobility level of the wireless communication device 200, for example a speed of the wireless communication device at 200. For example, the higher the mobility level of the wireless communication device 200, the higher the repetition rate may be selected. The shorter the paging discard timer, the higher the repetition rate may be selected. In general, the repetition rate may be a function of the mobility level and/or the paging discard timer. For example, a time duration between two measurements of the received power may be shorter than the paging discard timer (in worst case the same time as the paging discard timer).

Thus, while delaying the transmission of the TAU request, the wireless communication device repeats measuring the power of the downlink reference signal according to the repetition rate. The measured received power of the downlink reference signal may be compared with a power threshold which may be predetermined or which may also be indicated in the delay configuration. Upon exceeding the power threshold, the wireless communication device 200 may abort delaying the transmission of the TAU request. This may happen in particular when the wireless communication device 200 is moving closer to the network node 120 of the newly entered tracking area 392. To sum up, the transmission of the TAU request is delayed until either the wireless communication device 200 has been moved sufficiently close to the network node 120 or until the paging discard timer is nearly expired.

After delaying the TAU request at 409, at 410 the wireless communication device 200 may initiate a random access (RA) procedure at cell 320 and may request a TAU at 411. Based on the measurement of the received power of the downlink reference signal, the wireless communication device 200 may determine a repetition level of the transmission of the TAU request. As the transmission of the TAU request is delayed, the received power of the downlink reference signal may be significantly larger than it was at the border of cell 320 when the wireless communication device 200 was entering the cell 320. Therefore, the repetition level, i.e. the number of repetitions for transmitting the TAU request, may be significantly lowered or the TAU request may be transmitted only once. Furthermore, a transmission power of the transmission of the TAU request may be based on the received power of the downlink reference signal and may be significantly reduced due to the delayed transmission. As a result, the TAU signaling is more robust and less power consuming.

The TAU request is forwarded by the network node 120 to the mobility management node 190 at 412, and the mobility management node 190 may accept the TAU at 413. The network node 120 may transmit a TAU accept message and a delay configuration at 414 and 415, respectively. As discussed above, the delay configuration may be transmitted in a separate message at 415 or in combination with the TAU accept message at 414. Upon receiving the TAU accept message and the delay configuration, the wireless communication device 200 may enter the idle mode at 416.

Figure 5:
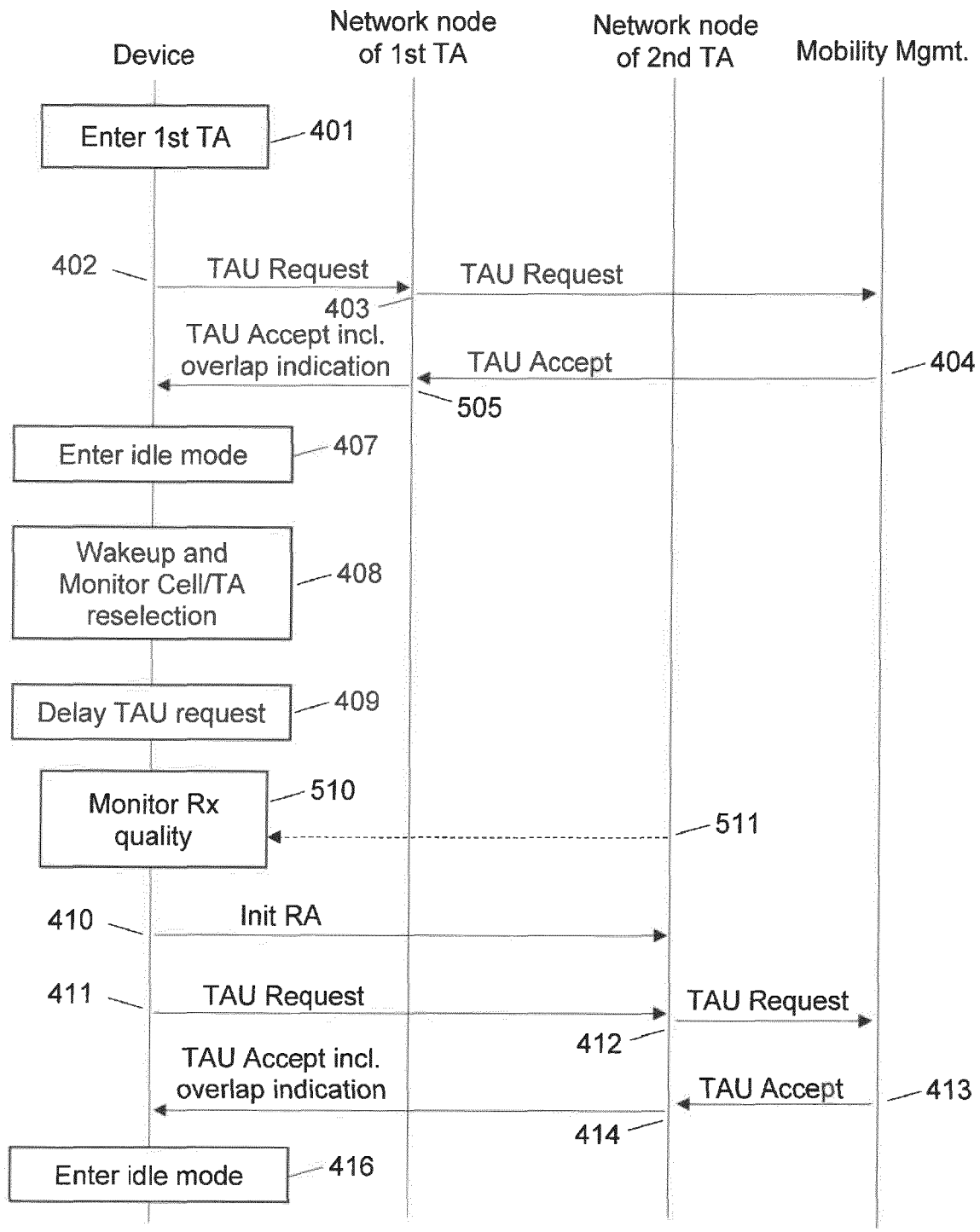
FIG. 5 schematically illustrates operation of the wireless communication device and the network node according to further examples.

FIG. 5 schematically shows further operations of the wireless communication device 200, the network nodes of the first and second tracking areas 391 and 392, and the mobility management node 190. Some operations are similar or identical to the operations described above in connection with FIG. 4 and will therefore designated with the same reference signs. At 401, the wireless communication device 200 may enter the first tracking area 391 by entering cell 300. The current tracking area list (TAL) configured in wireless communication device 200 may not include cell 300. Therefore, the wireless communication device 200 may transmit, at 402, a tracking area update (TAU) request to the network 50, in particular to network node 100 of cell 300. At 403, the network node 100 may forward the TAU request to the mobility management node 190, which in turn may accept the tracking area update request and may transmit, at 404, a corresponding TAU accept message to the network node 100. The network node 100 forwards the TAU accept message at 505 to the wireless communication device 200. The TAU accept message may include a tracking area list (TAL) indicating that cells 300 and 310 belong to the first tracking area 391. Additionally, the network node 100 may transmit a delay configuration to the wireless communication device 200. The delay configuration may be included in the TAU accept message or may be comprised in a separate message. The delay configuration may indicate, whether a delaying of a transmission of a tracking area update request message is allowed when the wireless communication device 200 leaves the first tracking area 391 and enters another tracking area, for example the second tracking area 392. In particular, the delay configuration may indicate whether the current tracking area 391, in which the wireless communication device 200 is currently located, at least partly overlaps a neighboring tracking area, for example the adjacent second tracking area 392. For example, cell 320 may represent such an overlap of the first tracking area 391 and the second tracking area 392. Cell 320 is defined to belong to the second tracking area 392. However, although cell 320 is not formally defined to belong to the first tracking area 391, the network node 120 of cell 320 may be configured to transmit paging signals for the wireless communication device 200 although the wireless communication device 200 has not transmitted a paging area update request to register at the second tracking area 392. The delay configuration may indicate cell 320 as an overlapping cell. As a result, when the wireless communication device 200 is traveling along the path 60 from cell 310 of the first tracking area 391 into cell 320, based on the knowledge that it will receive paging signals in cell 320, the wireless communication device 200 may delay the transmission of the paging area update request. However, after the delay, the device 200 may transmit the paging area update request to register at the second tracking area 392 to ensure receiving paging signals in cells 320, 330 and 340.

After having received the TAU accept and the delay configuration, the wireless communication device 200 may enter at 407 an idle mode. For example, the wireless communication device 200 may enter the discontinuous reception (DRX) cycle according to 3GPP 4G and 5G technologies.

At 408, the wireless communication device 200 may wake up, i.e. transition from the inactive state to the active state of the DRX cycle, and may monitor whether a cell reselection or a tracking area reselection is required. For example, when the wireless communication device 200 is travelling along the path 60, the wireless communication device 200 may leave the cell 300 and may enter cell 310. As cell 310 belongs to the same first tracking area 391 as cell 300, a tracking area reselection is not required. However, when the wireless communication device 200 travels along the path 60, it may enter cell 320 which is not listed in the current tracking area list. This may trigger that a tracking area update is required for the wireless communication device 200. However, due to the delay configuration information received at 505, the wireless communication device 200 may delay the transmission of the TAU request at 409.

As noted above, the delay configuration information may indicate that the first tracking area 391 and the second tracking area 392 are overlapping. As shown in FIG. 1, cell 310 of the first tracking area 391 and cell 320 of the second tracking area 392 both cover an overlapping area 350. The wireless communication device 200, when traveling along the path 60, may detect cell 320 when the wireless communication device 200 is coming from cell 310 and enters the overlapping area 350. As the wireless communication device 200 is informed that the tracking areas 391 and 392 are overlapping, the wireless communication device 200 may delay the transmission of the TAU request. For example, the delay configuration may have further indicated an amount of the overlapping between the first tracking area 391 and the second tracking area 392, for example a width of the overlapping area 350. For example, the delay configuration may indicate that the amount of the overlapping between the first tracking area 391 and the second tracking area 392 is one cell. Additionally, the delay configuration may identify the overlapping cell. Thus, the wireless communication device 200 may delay the transmission of the TAU request until the wireless communication device 200 has traveled along the width of the overlapping area 350, for example based on speed and timing measurements of the wireless communication device 200.

In another example, the delay configuration may have further indicated a power condition. The wireless communication device 200 may measure at 510 a received power of a downlink reference signal transmitted at 511 from the network node 120 serving the cell 320. The wireless communication device 200 may delay the transmission of the TAU request until the received power fulfills the power condition. For example, the transmission of the TAU request may be delayed until the received power exceeds a power level threshold indicated in the power condition. Steps 409 and 510 may be performed repeatedly several times at a predefined repetition rate. Between the repeated measurements at 510, the wireless communication device 200 may enter a sleep or inactive state for reducing power consumption.

In any case, while traveling in the overlapping cell 320 or the overlapping area 350, the wireless communication device 200 may still receive paging signals from the network node 110 such that delaying the TAU request may not jeopardize reception of a paging signal from the network node 110.

After delaying the TAU request at 409, at 410 the wireless communication device 200 may initiate a radio access procedure at cell 320 and may request a TAU at 411. Based on the received power of the downlink reference signal, the wireless communication device 200 may determine a quality of the radio channel between the wireless communication device 200 and the network node 120. Based on the quality, the wireless communication device 200 may determine a repetition level of the transmission of the TAU request. As the transmission of the TAU request is delayed, the wireless communication device 200 may have moved closer to the network node 120 during the delay. Consequently, the lastly received power of the downlink reference signal may be significantly larger than it was when the wireless communication device 200 entered the overlapping area 350. Therefore, at 411, only a few repetitions for transmitting the TAU request may be necessary or the TAU request may be transmitted only once. Furthermore, a transmission power of the transmission of the TAU request may be based on the lastly received power of the downlink reference signal and may be significantly reduced due to the delayed transmission. As a result, the TAU signaling is more robust and less power consuming. Furthermore, due to the overlap, the risk of missing a paging signal may be decreased.

The TAU request is forwarded by the network node 120 to the mobility management node 190 at 412 and the mobility management node 190 may accept the TAU at 413. The network node 120 may transmit a TAU accept message including a delay configuration at 414. As discussed above, the delay configuration may be transmitted in a separate message or in combination with the TAU accept message. The delay configuration may comprise a further overlap indication. Upon receiving the TAU accept message and the delay configuration, the wireless communication device 200 may enter the DRX cycle at 416.

The above described methods of delaying the transmission of a TAU request may be combined with each other. For example, the TAU request may be delayed as long as the paging discard timer is not expired or the wireless communication device is located within the overlapping cell 320 or within the overlapping area 350. In any case, delaying the transmission of the TAU request may be aborted upon detecting that the power condition concerning the received power of the downlink reference signal from the network node 120 is fulfilled.

Figure 6:
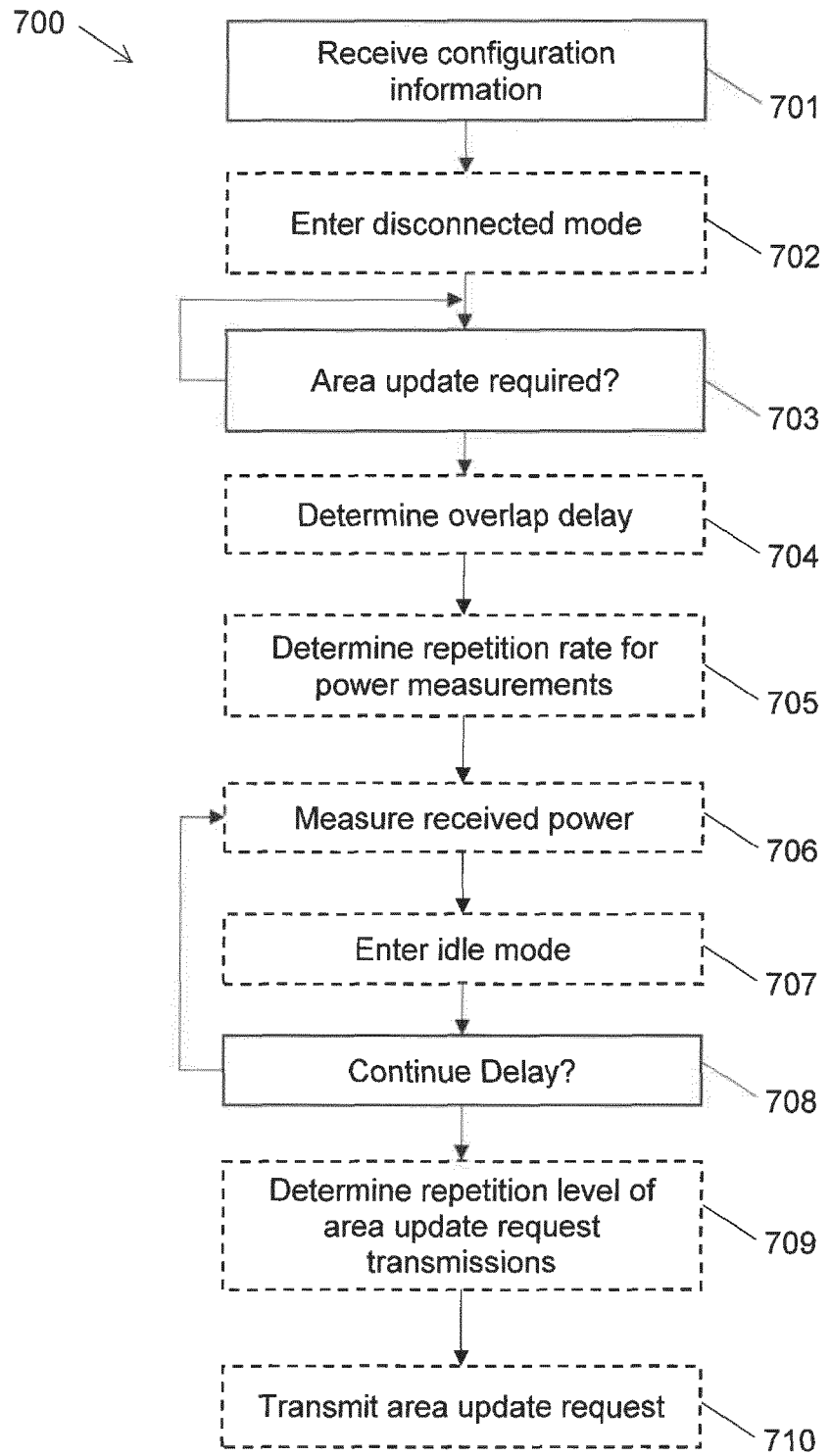
FIG. 6 is a flowchart of a method according to various examples.

FIG. 6 schematically shows a method 700 which may be performed by the wireless communication device 200. The method comprises method steps 701 to 710. The method steps in dashed boxes may be optional.

In step 701, the wireless communication device 200 may receive, from the cellular network 50, configuration information for delaying a transmission of a paging area update request. The paging area update request may comprise in particular a tracking area update (TAU) request. The tracking area update request may trigger a tracking area update of a tracking area of a paging operation of the wireless communication device 200.

The configuration information may indicate a paging discard timer associated with the length of a paging escalation sequence of the paging operation. As described above, the paging discard timer may indicate the maximum time the network 50 repeatedly transmits paging signals to the wireless communication device 200 before the network 50 considers that the wireless communication device 200 is not present in the presently registered tracking area or has been switched off. For example, the paging discard timer may define a time between a start of a last escalation of paging until the network 50 considers that the wireless communication device 200 is not reachable anymore. The wireless communication device 200 may use the paging discard timer for delaying the transmission of the tracking area update. For example, the wireless communication device 200 may delay the transmission of the tracking area update request at most until expiry of the paging discard timer.

In other examples, the configuration information may indicate whether the current tracking area, in which the wireless communication device 200 is currently located, overlaps a neighboring tracking area which is adjacent to the current tracking area. As shown in FIG. 1, the configuration information may indicate that the tracking area 391 is overlapping the neighboring tracking area 392. The wireless communication device 200 may selectively delay the transmission of the tracking area update request if the configuration information indicates that the current tracking area overlaps the neighboring tracking area.

In general, the configuration information may indicate whether the delaying of the transmission of the tracking area update request message is allowed or not.

In step 702, the wireless communication device 200 may enter a disconnected mode, for example the discontinuous reception (DRX) cycle defined in the 3GPP technologies. The configuration information may be received, at least partially, by the wireless communication device 200 when the wireless communication device 200 is operated in a connected mode prior to a transition to the disconnected mode. For example, the configuration information may be included, at least partially, in a connection deactivation message which triggers the transition to the disconnected mode. In other examples of, the configuration information may be included, at least partially, in a broadcasted system information block, for example a system information block (SIB) as defined in 3GPP technologies.

In the DRX cycle, the wireless communication device 200 may switch between an active state and an inactive state. Most of the time, the wireless communication device 200 may remain in the inactive state. In the active state, the wireless communication device 200 may receive signals from the network 50 and may determine whether a tracking area update is required in step 703. As long as no tracking area update is required, the wireless communication device 200 may remain in the DRX cycle. The wireless communication device 200 may leave the DRX cycle and may enter a connected mode upon other triggers as it is known in the art, for example upon receiving a paging signal.

When the wireless communication device 200 is operating in the disconnected mode and determines in step 703 that a tracking area update is required, for example because the wireless communication device 200 has moved into a cell of another tracking area, the wireless communication device 200 does not immediately transmit a tracking area update request to the network 50, but the wireless communication device 200 delays the transmission of the tracking area update request in accordance with the configuration information received in step 701 as will be explained in the following.

For example, in step 704, the wireless communication device 200 may determine a delay for transmitting the tracking area update request based on the information that the current tracking area overlaps a neighboring tracking area. For example, based on a current speed of the wireless communication device 200 and an overlapping width of the overlap between the current tracking area and the neighboring tracking area, the wireless communication device 200 may determine a time duration for which the wireless communication device 200 will presumably remain in the overlapping area. The transmission of the tracking area update request may be delayed for this time duration.

In further examples, the wireless communication device 200 may receive tracking area information broadcasted by a network node of a current cell in which the wireless communication device 200 is currently arranged. For example, the wireless communication device 200 travels from cell 310 into cell 320 and may receive tracking area information from the network node 120. The tracking area information may indicate that cell 320 is included in tracking area 391 and that cell 320 is also included in tracking area 392. Based on the configuration information received in step 701 which indicates that delaying of a transmission of a tracking area update request is allowed, the wireless communication device 200 may delay a transmission of the tracking area update request for the following reasons: While camping in cell 320 and having not yet transmitted the tracking area update request, the wireless communication device 200 will receive paging signals as cell 320 is configured to belong to tracking area 391 at which the wireless communication device 200 is still registered. The wireless communication device 200 may delay the transmission of the tracking area update request for a predetermined amount of time or for a time period depending on the speed of the wireless communication device 200 or until power conditions are fulfilled as described below. Then, the wireless communication device 200 may transmit the tracking area update request to the network node 120. After that, the wireless communication device 200 may receive paging signals as cell 320 is additionally configured to belong to the tracking area 392 at which the wireless communication device 200 is now registered.

Additionally or as an alternative, the transmission of the tracking area update request may be delayed until a power condition concerning a received power of a downlink reference signal of the cell of the other tracking area into which the wireless communication device 200 has moved is fulfilled. Details will be described below. For example, the power condition may be predefined in the wireless communication device 200 or the power condition may be indicated in the configuration information.

For example, based on the information that there is an overlap between the tracking area from which the wireless communication device 200 is a coming and the tracking area to which the wireless communication device 200 is moving, the wireless communication device 200 may delay the transmission of the tracking area update request until the power condition is fulfilled. For example, the wireless communication device 200 notices that it has left the first tracking area 391 but it knows, based on the overlap information, that the cell 320, belonging to second tracking area 392, also transmits the paging signals to the wireless communication device 200 even though it does not formally belong to the first tracking area 391. Therefore the tracking area update transmission may be delayed. As the wireless communication device 200 receives the paging signals in cell 320, the above-mentioned paging discard timer may not expire as long as the wireless communication device 200 responds to the paging signals in cell 320. However, transmitting a tracking area update request for registering at the new tracking area is still required, but may be postponed until sufficient communication quality with the network node 120 of cell 320 is achieved.

In further examples, in which the wireless communication device 200 enters a cell of the neighboring tracking area but is not paged by the newly entered cell as described above, the wireless communication device 200 may base the delay of the transmission of the tracking area update request on the paging discard timer. For example, the transmission of the tracking area update request is delayed at most until expiry of the paging discard timer. Additionally, the delaying of the transmission of the tracking area update request may be aborted if a power condition is fulfilled which is related to a power of a downlink reference signal of the cell of the tracking area into which the wireless communication device 200 is moving.

In detail, in step 705, the wireless communication device 200 may determine a repetition rate for power measurements. For example, the repetition rate may be determined based on the above-mentioned overlap related time duration for which the wireless communication device 200 will presumably remain in the overlapping area. In other examples, the repetition rate may be determined based on the paging discard timer. For example, the repetition rate may be determined such that a time interval between two successive power measurements is a fraction of the overlap related time duration or the paging discard timer, for example a tenth thereof. In further examples the repetition rate may be based on a mobility level of the wireless communication device at 200, for example a speed of the wireless communication device 200. Furthermore, the repetition rate may be based on predefined or pre-configured repetition rates, for example a repetition rate defined by network related standards, a repetition rate predefined for the network 50 or for specific tracking areas of the network 50, and communicated to the wireless communication device 200 by the network 50.

In step 706 the wireless communication device 200 measures a received power of a downlink reference signal from the cell into which the wireless communication device 200 has moved and for which the transmission of the tracking area update request is required. After measuring the received power, the wireless communication device 200 may enter idle mode in step 707 until the next measurement is required according to the repetition rate. In step 708 the wireless communication device 200 determines whether delaying the transmission of the tracking area update request may be continued, for example by checking whether the overlap related time duration or the paging discard timer have expired. If delaying the transmission of the tracking area update request is allowed to be continued, a next measurement of the received power may be performed in step 706. Otherwise, the wireless communication device at 200 continues in step 709 with preparing the transmission of the tracking area update request. Additionally, upon detecting that the received power fulfills the above described power condition, the delaying of the tracking area update request may be aborted and the wireless communication device 200 continues processing in step 709.

In step 709, the wireless communication device 200 may determine a repetition level of the transmission of the tracking area update request. The repetition level may be determined based on the received power of the downlink reference signal, for example based on the received power measured in the last measuring cycle of steps 706 to 708 described above. Repetition of the transmission of the tracking area update request means to transmit the tracking area update request a plurality of times for improving reception quality at the receiving network node. The received power of the downlink reference signal may indicate a transmission quality of the radio channel between the wireless communication device and the network node to which the tracking area update request is transmitted. The better the transmission quality of the radio channel, the fewer repetitions of the tracking area update request are necessary. Furthermore, a transmit power of the transmission of the tracking area update request may be determined based on the received power of the reference signal. The better the transmission quality of the radio channel, the lower the transmit power of the transmission of the tracking area update request can be. In general, the repetition level and/or the transmit power may be a function of the received power. In step 710, the tracking area update request is transmitted according to the determined repetition level and transmit power.

Figure 7:
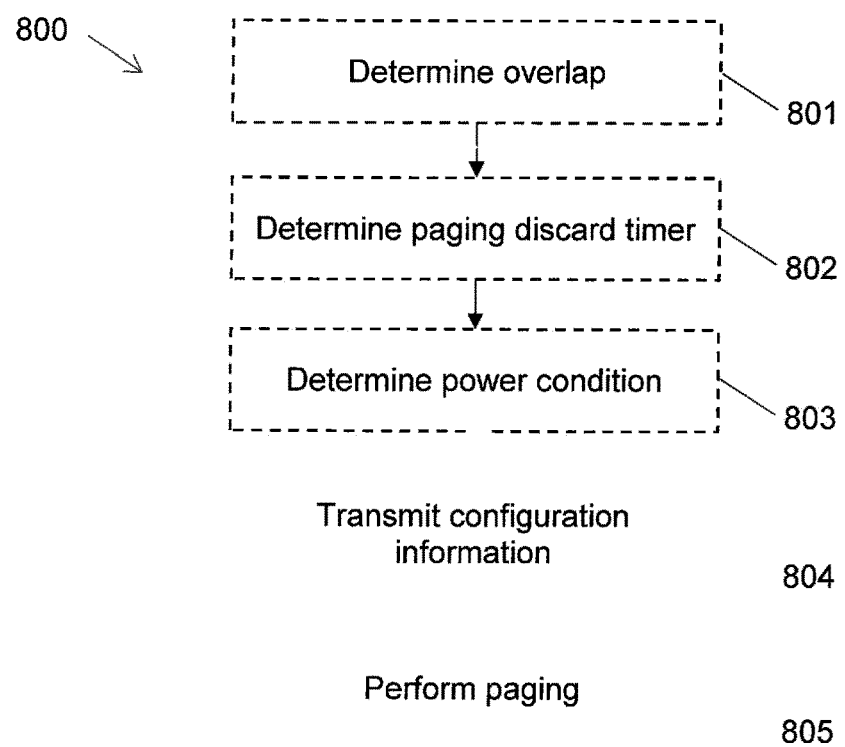
FIG. 7 is a flowchart of a method according to various examples.

FIG. 7 schematically shows a method 800 comprising method steps 801 to 805. The method 800 may be performed by a network node, for example any one of the network nodes 100 to 140 shown in FIG. 1. Although, in the following, reference will be made primarily to network node 100, network nodes 110 to 140 may perform the method steps in the same way. Method steps in dashed boxes may be optional.

In step 801 the network node 100 may determine an overlap of a tracking area to which the network node 100 belongs and a neighboring tracking area. For example, the network node 100 may receive information concerning this overlap from the mobility management node 190 of the network 50. For example, the network node 100 may determine that cell 320 of tracking area 392 is defined as an overlapping cell in which also paging signals of tracking area 391 are transmitted.

Furthermore, in step 802, the network node 100 may determine a paging discard timer used in a tracking area. The paging discard timer may be defined for the network 50 or specifically for each tracking area and may be provided by the mobility management node 190 of the network 50.

In further examples, the network node 100 may determine in step 803 a power condition. The power condition may comprise a power threshold. The power threshold may have a value which indicates that a wireless communication device, for example the wireless communication device 200, when receiving a power reference signal from a network node exceeding this power threshold, is located in a location in which considerable good communication conditions with the network node are present such that no or only a few repetitions of transmissions for coverage improvement are required. The power condition may be determined considering the above-mentioned overlapping conditions of neighboring tracking areas. For example, the power threshold may be set to a higher value in case of a large overlapping between adjacent tracking areas and the power threshold may be set to a lower value in case of the small overlapping between adjacent tracking areas. In other words, the power condition may be a function of the amount of overlap between adjacent tracking areas.

In step 804, the network node 100 may transmit configuration information to a wireless communication device, for example the wireless communication device 200, when the wireless communication device is entering the tracking area 391 to which the cell 300 of the network node 100 is assigned. For example, when the network node 100 receives a TAU request message and responds with a TAU accept message, the network node 100 may include the configuration information in the TAU accept message or may transmit a separate message comprising the configuration information. The configuration information is used by the wireless communication device for delaying a transmission of a tracking area update request that triggers a tracking area update of a tracking area of a paging operation of the wireless communication device when the wireless communication device leaves the present tracking area and enters a neighboring tracking area. The configuration information may be transmitted, at least partly, when the wireless communication device operates in a connected mode, prior to a transition to a disconnected mode. For example, the configuration information may be at least partly included in a connection deactivation message which triggers the transition to the disconnected mode. Additionally or as an alternative, the configuration information may be at least partly included in a broadcasted system information block.

In general, the configuration information may indicate whether a delaying of a transmission of a tracking area update request message is allowed. The configuration information may comprise information concerning at least one of overlap, paging discard timer and power condition.

In step 805 the network node 100 performs the paging operation in accordance with the configuration information when the wireless communication device 200 operates in a disconnected mode. In particular, the network node 100 performs a paging operation with a paging escalation sequence having a length associated with the paging discard timer. For example, according to the paging escalation sequence, the network node 100 may transmit paging signals until it receives a feedback thereon from the wireless communication device 200 or until the paging discard timer expires. For example, upon receiving a paging signal, the wireless communication device 200 may enter active state and may transmit a paging response to the network node 100 and may additionally initiate a communication establishment procedure. However, in case the network node 100 does not receive a corresponding feedback from the wireless communication device 200 until the paging discard timer expires, the network node 100 may notify to the mobility management node 190 that the paging discard timer has expired, for example by transmitting a paging escalation message to the mobility management node 190. According to the paging escalation sequence, the mobility management node 190 may change a paging level, for example include more cells of a tracking area or enlarge tracking area lists.

In further examples, when an overlap has been determined in step 801, a network node of the network 50 may be defined as an overlapping node which transmits paging signals for the wireless communication device 200 although the wireless communication device 200 is currently not registered at the tracking area to which the node belongs.

According to FIG. 1 and as described above, network node 120 may represent such an overlapping node. Network node 120 may belong to the second tracking area 392. Due to the overlap of the first and second tracking areas 391 and 392, the network node 120 may nevertheless transmit in step 805 paging signals for the wireless communication device 200 although the wireless communication device 200 is still registered at the first tracking area 391 and has not transmitted a tracking area update request to the network node 120 for registering at the second tracking area 392. The wireless communication device 200 may respond to the paging signal, e.g. by initiating a connection setup with the network 50 via cell 320. When the wireless communication device 200 travels further along the path 60, the wireless communication device 200 may transmit a tracking area update request to the network node 120, for example when the communication quality between the wireless communication device 200 and the network node 120 has reached a sufficient level.

The techniques described therein can be, in particular, beneficial for MTC or IoT devices. Such MTC or IoT devices typically do not have the same behavior as other communication devices, like mobile phones and smart phones, where many applications send/receive payload data often. By such payload data, it may be often required to transition the device into operation in the connected mode. Thus, operation in the idle mode may be occurring less often for normal devices, if compared to MTC or IoT devices. MTC or IoT devices will be paged less often. Thereby, the techniques described herein can have particular benefits in terms of power consumption for such device types.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various examples have been described in connection with an implementation of the paging area as TA or TAL. Other implementations of the paging area are conceivable.

The invention claimed is:

1. A method for operating a wireless communication device connectable to a cellular network comprising a plurality of cells, the method comprising:
   receiving, from the cellular network, configuration information for delaying a transmission of a paging area update request that triggers a paging area update of a paging area of a paging operation of the wireless communication device,
   when operating in a disconnected mode associated with the paging operation, determining that the paging area update is required, and
   upon determining that the paging area update is required, delaying the transmission of the paging area update request in accordance with the configuration information.

2. The method of claim 1, wherein the configuration information is indicative of a paging discard timer associated with a length of a paging escalation sequence of the paging operation.

3. The method of claim 2, wherein the transmission of the paging area update request is delayed at most until expiry of the paging discard timer.

4. The method of claim 1, wherein the configuration information is indicative of whether a current paging area in which the wireless communication device is currently located overlaps a neighboring paging area adjacent to the current paging area.

5. The method of claim 4, wherein the transmission of the paging area update request is selectively delayed if the configuration information indicates that the current paging area overlaps the neighboring paging area.

6. The method of claim 4, wherein the configuration information is indicative of a cell which is not defined to belong to the current paging area and in which paging signals for the wireless communication device are transmitted.

7. The method of claim 1, further comprising:
   measuring a received power of a downlink reference signal,
   wherein the transmission of the paging area update request is delayed until the received power fulfills a power condition.

8. The method of claim 7, wherein the received power is repeatedly measured while delaying the transmission of the paging area update request.

9. The method of claim 8, further comprising:
   determining a repetition rate of said repeated measuring of the received power based on at least one of a paging discard timer associated with a length of a paging escalation sequence of the paging operation, or a mobility level of the wireless communication device.

10. The method of claim 7, wherein the configuration information is indicative of the power condition.

11. The method of claim 7, further comprising:
    determining a repetition level of the transmission of the paging area update request based on the received power of the reference signal.

12. The method of claim 1, wherein the configuration information is indicative of whether said delaying of the transmission of the paging area update request message is allowed.

13. The method of claim 1, wherein the method comprises:
    entering a sleep state while delaying the transmission of the paging area update request.

14. The method of claim 1, wherein the configuration information is at least partly received when operating in a connected mode, prior to a transition to the disconnected mode.

15. The method of claim 14, wherein the configuration information is at least partly included in a connection deactivation message triggering the transition to the disconnected mode.

16. The method of claim 1, wherein the configuration information is at least partly included in a broadcasted system information block.

17. A method of operating a node of a cellular network comprising a plurality of cells, the method comprising:
    transmitting, to a wireless communication device, configuration information for delaying a transmission of a paging area update request upon the wireless communication device determining that a paging area update is required, wherein the paging area update request triggers the paging area update of a paging area of a paging operation of the wireless communication device,
    when the wireless communication device operates in a disconnected mode associated with the paging operation, performing the paging operation in accordance with the configuration information.

18. The method of claim 17, wherein the configuration information is indicative of a paging discard timer associated with a length of a paging escalation sequence of the paging operation.

19. The method of claim 17, wherein the configuration information is indicative of whether a current paging area in which the wireless communication device is currently located overlaps a neighboring paging area adjacent to the current paging area.

20. A wireless communication device connectable to a cellular network comprising a plurality of cells, the wireless communication device comprising control circuitry configured to
- receive, from the cellular network, configuration information for delaying a transmission of a paging area update request that triggers a paging area update of a paging area of a paging operation of the wireless communication device,
- determine that the paging area update is required, when operating in a disconnected mode associated with the paging operation, and
- delay the transmission of the paging area update request in accordance with the configuration information upon determining that the paging area update is required.

* * * * *